United States Patent
Hanks et al.

(10) Patent No.: US 7,549,362 B2
(45) Date of Patent: Jun. 23, 2009

(54) PRECISION SHEARING TO FINISH MACHINED METALLIC COMPONENTS

(75) Inventors: Ryan L. Hanks, Bunker Hill, IL (US); Keith A. Young, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 209 days.

(21) Appl. No.: 10/956,813

(22) Filed: Oct. 1, 2004

(65) Prior Publication Data

US 2006/0070501 A1    Apr. 6, 2006

(51) Int. Cl.
*B26D 1/00* (2006.01)
(52) U.S. Cl. ........................................ 83/694; 30/272.1
(58) Field of Classification Search .................. 83/692, 83/693, 694, 828, 624, 625, 627, 917, 697, 83/583, 585, 588, 589, 633, 635, 563, 601, 83/605, 613, 821; 30/272.1, 273, 278, 282, 30/112, 113, 114, 182, 241
See application file for complete search history.

(56) References Cited

U.S. PATENT DOCUMENTS

| | | | | | |
|---|---|---|---|---|---|
| 606,261 | A | * | 6/1898 | Yates | 83/613 |
| 653,928 | A | * | 7/1900 | Dixon et al. | 83/588 |
| 686,687 | A | * | 11/1901 | Chaffee | 82/99.1 |
| 1,559,083 | A | * | 10/1925 | Friederici | 83/627 |
| 1,594,696 | A | * | 8/1926 | Rose | 83/588 |
| 1,681,739 | A | * | 8/1928 | McLaughlin | 83/636 |
| 1,884,001 | A | * | 10/1932 | Lewis | 83/694 |
| 2,595,841 | A | * | 5/1952 | Glick et al. | 30/229 |
| 3,971,279 | A | * | 7/1976 | Wright | 83/649 |
| 4,033,388 | A | * | 7/1977 | Ruegger | 140/106 |
| 4,970,925 | A | * | 11/1990 | Nakatsuji | 83/693 |
| 5,542,182 | A | * | 8/1996 | Martinez | 30/179 |
| 6,049,984 | A | * | 4/2000 | McGehee | 30/113 |
| 6,112,418 | A |  | 9/2000 | Strater | |
| 7,000,521 | B1 | * | 2/2006 | Cheng et al. | 83/635 |

* cited by examiner

*Primary Examiner*—Stephen Choi
(74) *Attorney, Agent, or Firm*—Yee & Associates, P.C.; Brett L. Halperin

(57) ABSTRACT

A precision shear is provided which allows the removal of material from a machined part. The shear provides a precision cut, and may be operated by hand or attached to a machine.

8 Claims, 2 Drawing Sheets

PRECISION SHEARING TO FINISH MACHINED METALLIC COMPONENTS

BACKGROUND OF THE INVENTION

This invention relates to a precision shear for the removal of material from metallic parts, and more particularly, to a precision shear which has the ability to remove undesirable machining tabs from finished metallic parts in a quick and efficient manner.

Many aerospace aluminum and titanium parts are fabricated by machining from a solid billet or hand forging. In most cases the finished part is held in place by leaving a surrounding frame of solid material and leaving tooling tabs to hold the finished part within the surrounding frame. Typically this picture frame is cut away with a band saw, abrasive wheel or other method. Then the remaining sections of the tooling tabs must be cut away. This is typically done by hand grinding and sanding operations.

The deburring and finishing of the tooling tabs can be a time consuming process and can consume as much as 20% of the total cycle time for fabricating a part.

Currently removing tooling tabs from a picture-framed metallic machined part requires die grinding and hand sanding operations. These hand operations can be time consuming, hazardous and imprecise. Grinding operations produce fine metallic particles and special stations must be used to collect and dispose of these particles to prevent inhalation.

As can be seen, there is a need for a device that can quickly and precisely remove the unwanted portions of a work piece. There is also a need for a simple and efficient means to remove tooling tabs from a picture-framed metallic part. Moreover, there is a need for a finishing method that quickly and precisely cuts away the tooling tabs leaving only the finished part and does not require additional hand blending or sanding operations. In addition, there is a need for significantly reducing or completely eliminating the airborne particles produced in finishing operations.

SUMMARY OF THE INVENTION

In one aspect of the invention, an apparatus for shearing material is provided comprising a scissor mechanism comprising a first handle pivotably connected to a second handle. Also provided is a first jaw associated with the first handle and a second jaw associated with the second handle. A cutter is disposed between the first and second jaw, and the cutter is configured to cut through a predetermined thickness of material as the first jaw and the second jaw are moved to a closed position. An alignment surface configured to align with the cutter at a predetermined position in relation to a workpiece is also provided and a support is provided which is configured to buttress the workpiece as the cutter is forced through the material.

In another aspect of the present invention, a precision shear for removing tabs from a picture-framed metallic machined part is provided which comprises a first handle having a first jaw and a second handle having a second jaw. A pivot is disposed on the first handle and the second handle, wherein the pivot is configured to move the first and second jaws selectably to an open and closed position. A cutter mechanism is provided that is disposed intermediate the first and second jaws, and the cutter mechanism is configured to remove the tabs from the machined part. Also provided is an alignment surface configured to align the cutter along a predetermined position in relation to the machined part and a spring is provided which is configured to bias the first jaw and the second jaws to an open position.

In yet a further aspect of the present invention, a method for shearing material is provided that comprises the steps of providing a scissor mechanism comprising a first handle pivotably connected to a second handle. A first jaw associated with the first handle and a second jaw associated with the second handle is provided and a cutter is disposed between the first and second jaw, where the cutter is configured to cut through a predetermined thickness of metal as the first jaw and the second jaw are moved to a closed position. An alignment surface is configured to align the cutter at a predetermined position in relation to a workpiece and a support is configured to buttress the workpiece as the cutter is forced through the material to be sheared. Next, the cutter is aligned with the material to be removed and pressure is applied to the first and second handle to force the cutter through the material to be sheared.

In a still further aspect of the present invention, a device for the removal of material from a machined metal part is provided which comprises a cutter vertically opposed from a support. Also provided is a scissor mechanism configured to move the cutter toward the support. An alignment surface is configured to align the cutter with the material to be removed from the machined metal part wherein the cutter is forced through the machined part to remove material thereby producing a finished machined part that requires little or no finishing operations.

These and other features, aspects and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The precision shearing device described herein is suitable for use for the production of machined metal parts. More specifically, the precision shear lends itself particularly well to the removal of machining tabs that require precision removal from a machined part thereby reducing or eliminating the need for finish grinding or polishing. In addition, the device may be operated by hand or adapted for use with a hydraulically or pneumatically powered apparatus.

The precision shearing device described herein provides a unique means for the quick and economical removal of unwanted material from a finished machine part. The device provides an alignment feature which allows the operator to quickly and easily determine the cut line which will require little or no additional grinding or polishing. The prior art required the use of large machines such as a band saw to remove the unwanted material. Typically, the use of a band saw or other method would also require additional finish machining operations such as filing or polishing to produce an acceptable part. The unique cutter provided with the current device is configured to produce a clean cut through the cut line that leaves an edge along the finished part that meets the finish requirements of the machined part. The unique high strength cutter is held in precise alignment with the desired cut line and the cutter is configured to produce an accurate, clean cut through the material.

Figure 1:
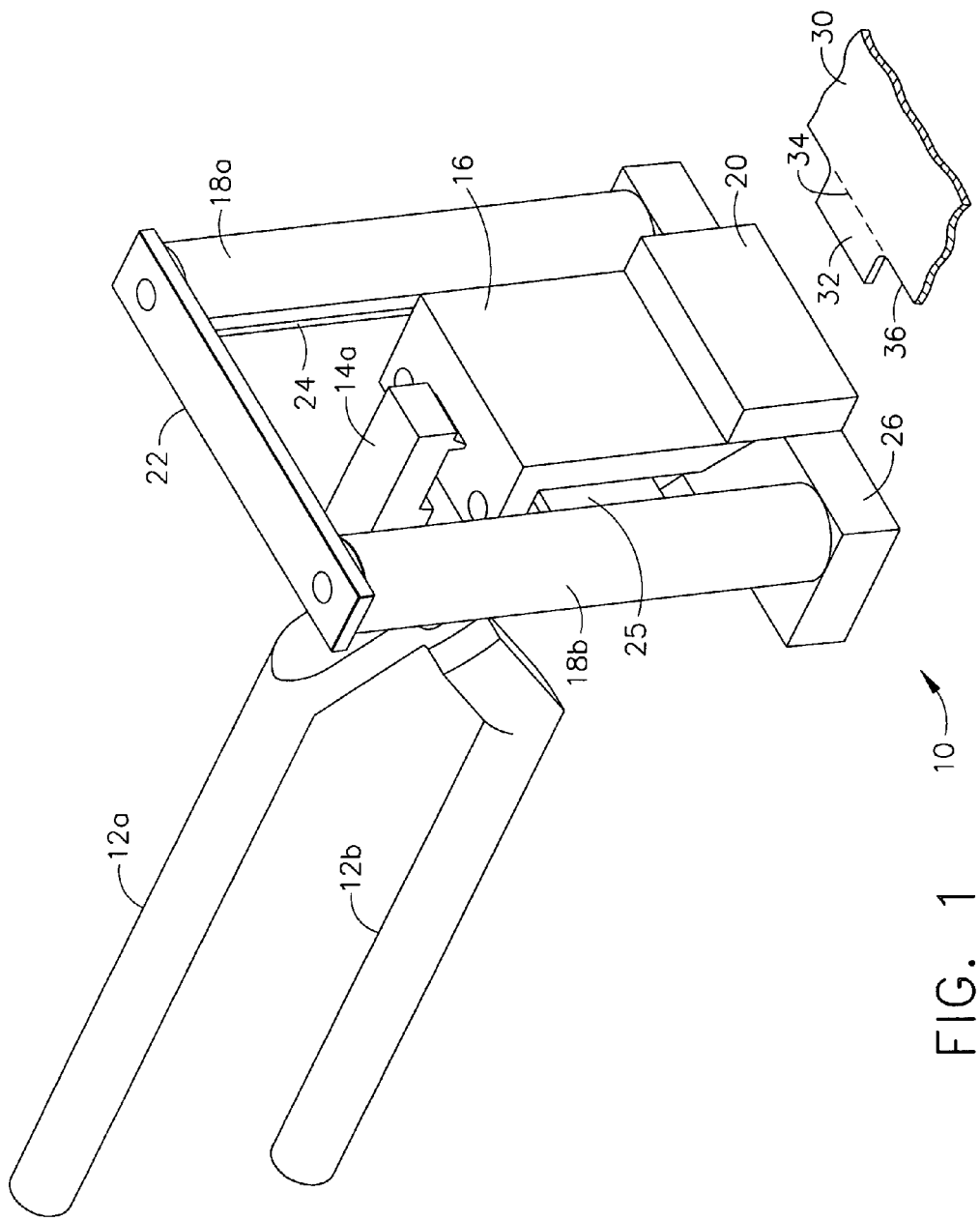
FIG. 1 is an isometric front view of the precision shear.
Figure 2:
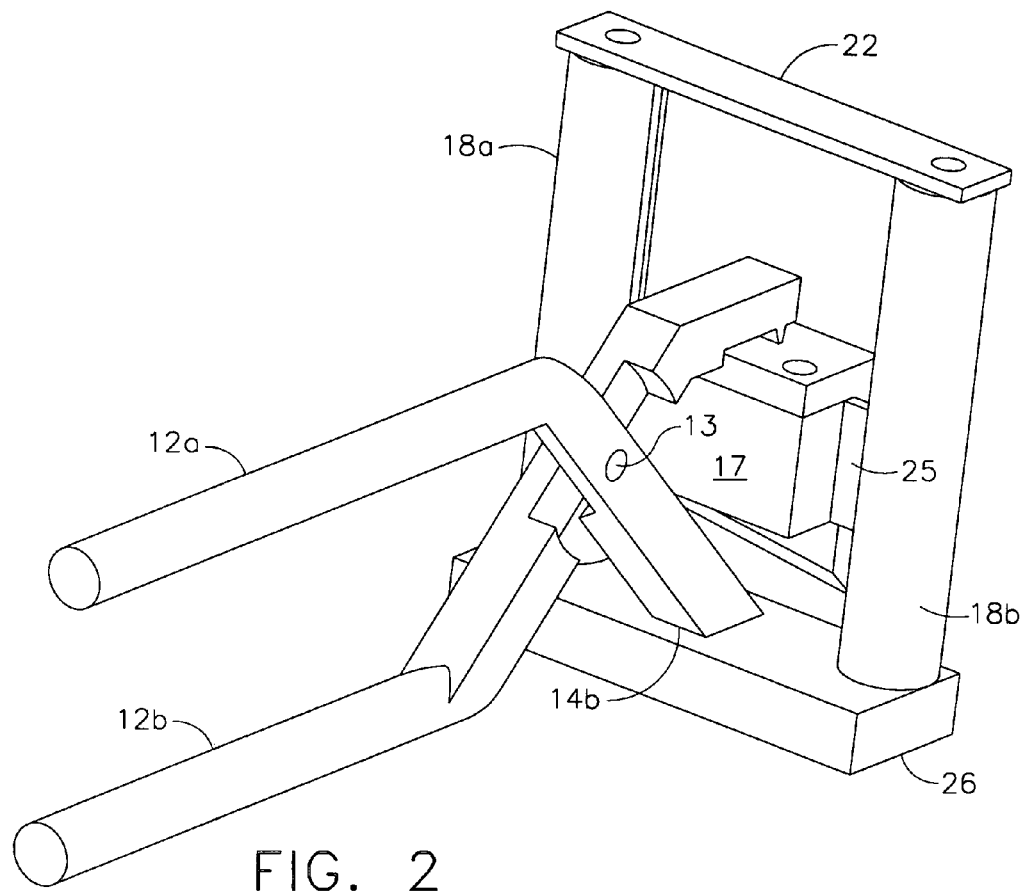
FIG. 2 is an isometric back view of the precision shear.

Referring now to FIGS. 1 and 2, which show the precision shear in accordance with an embodiment of the invention, the shear 10 is comprised of a first handle 12a and a second handle 12b pivotably connected to one another by a pivot 13.

Located at one distal end of the first handle 12a is a first jaw 14a. Also located at one distal end of second handle 12b is second jaw 14b such that first jaw 14a and second jaw 14b may be opened and closed by the opening and closing of the first and second handle 12a and 12b. First and second handle 12a and 12b are configured to interface with a human hand so that it may be hand operated by squeezing the operator's hand around the first and second handles. The length of the handles 12a and 12b may be specifically tailored to provide the proper cutting force as required by the material that is being worked.

A cutter 16 and a support 20 are vertically opposed from one another. The cutter 16 may be in contact with the first jaw 14a and the support 20 may be affixed to the second jaw 14b. With the first jaw 14a not affixed to the cutter 16, the force applied to the cutter 16 can be optimized to eliminate any rotating moment that may act to bind the cutter 16 as it moves up and down. The support 20 is configured to buttress the work piece 30 and may extend from the plane of the cutter. A pair of tabs 25 extend from the cutter 16 and are configured to be slidably received by a respective pair of slots 24 that are disposed on a respective first bar 18a and a second bar 18b. The tabs are configured to maintain the alignment of the cutter 16 as it is forced through the material that is to be removed from the work piece 30 thereby creating a clean cut which requires little or no finishing. A base 26 and a top bar 22 extend across the width of the cutter 16 to affix the location of the first and second bar 18a and 18b.

An optional resilient material (not shown) may be provided that acts to bias the shear to the open position. This resilient material may be a spring or an elastomeric material. Typically, this resilient material would be disposed between the first jaw 14a and the second jaw 14b and would force the jaws to an open position to allow insertion of the material to be removed.

Figure 3:
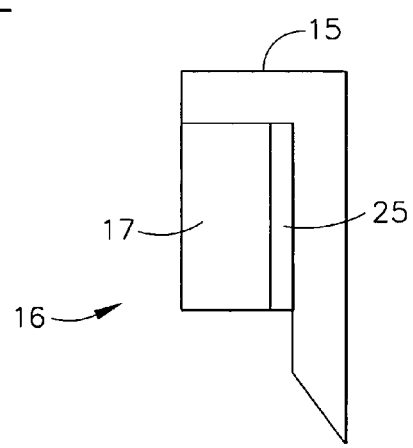
FIG. 3 is a simplified side view of a two piece cutter.

Referring now to FIG. 3, which shows a close up view of a two piece cutter, the cutter 16 may be comprised of a block 17 and a replaceable blade 15. The replaceable blade 15 may be affixed to the block 17 in any well known manner such as screws. The replaceable blade 15 would be configured to be removable in the event the blade becomes dull and requires replacement. This would ease the maintenance of the shear. The cutter 16 may be made from high strength material such as tungsten carbide or tool steel.

It is also contemplated that an embodiment of the present invention may allow the shear 10 to be installed in machinery such as a pneumatic or hydraulically powered press which would allow the removal of thicker material as well as increase the speed at which the shear 10 operates.

Referring again to FIGS. 1 and 2, the operation of the shear 10 will now be described. A work piece 30, which is a machined part that has a flange 32 extending from it requires further finishing. The flange 32 must be removed from the work piece 30 along a cut line designated by 34. The flange 32 is placed on the support 20 and the cut line 34 is aligned with the cutter 16. The first bar 18a and second bar 18b may be configured such that when surface 36 is abutted against the respective faces of first bar 18a and second bar 18b, the cut line 34 is automatically in line with the cutter 16. This feature will ease the use of the shear and decrease the time necessary to produce an accurate cut.

Once the flange 32 is placed beneath the cutter 16 and surface 36 is abutted against first and second bar 18a and 18b, the operator will apply closing pressure to the first and second handle 12a and 12b and force the cutter 16 through the material along the cut line 34. In this manner, the operator has quickly and easily removed unwanted material from the machined work piece 30 without the need for finish grinding or polishing.

It should be understood, of course, that the foregoing relates to preferred embodiments of the invention and that modifications may be made without departing from the spirit and scope of the invention as set forth in the following claims.

We claim:

1. An apparatus for shearing material from a workpiece comprising:
   a scissor mechanism comprising a first handle pivotally connected to a second handle;
   a first jaw connected to the first handle and a second jaw connected to the second handle;
   a base connected to the first jaw;
   a first bar connected to the base, wherein a first slot is disposed in the first bar;
   a second bar connected to the base opposite the first bar, wherein a second slot is disposed in the second bar;
   a cutter connected to the second jaw, wherein the cutter is disposed between the first jaw and the second jaw, and wherein the cutter is configured to cut through a workpiece as the second jaw is moved towards a closed position with respect to the first jaw;
   a first tab connected to the cutter, wherein the first tab is disposed in the first slot such that the first tab can slide within the first slot as the second jaw moves relative to the first jaw;
   a second tab connected to the cutter, wherein the second tab is disposed in the second slot such that the second tab can slide within the second slot as the second jaw moves relative to the first jaw; and
   a support connected to and vertically extending from the base in a plane of the cutter beyond a top surface of the base to oppose the cutter wherein the support is spaced apart from the first and second bars so as to align and buttress the workpiece relative to the cutter.

2. The apparatus of claim 1 further comprising:
   a top bar connected to the first bar and the second bar, wherein the top bar is disposed opposite the base such that the first tab and the second tab are prevented from moving out of the first slot and the second slot.

3. The apparatus of claim 1 wherein the cutter comprises:
   a block connected to the second jaw; and
   a replaceable blade connected to the block.

4. The apparatus of claim 1 further comprising:
   a resilient material configured to force the first jaw and the second jaw into an open position.

5. The apparatus of claim 1 wherein the cutter is composed of tungsten carbide.

6. The apparatus of claim 1 wherein a force applied by the first jaw is held in a fixed alignment with the cutter as the cutter is forced through the workpiece.

7. The apparatus of claim 1 further comprising a spring configured to bias the first jaw to an open position with respect to the second jaw.

8. The apparatus of claim 1 wherein the first bar, the first slot, the second bar, and the second slot are configured to restrain rotation of the cutter mechanism as the first tab and the second tab move within the first slot and the second slot.

* * * * *